(12) United States Patent
Nait Atmane et al.

(10) Patent No.: US 10,480,351 B2
(45) Date of Patent: Nov. 19, 2019

(54) SEGMENTED LINER

(71) Applicant: General Electric Company, Schenectady, NY (US)

(72) Inventors: Mohand-Ouamar Nait Atmane, Baden (CH); Filip Skurla, Karlovac (HR); Krunoslav Igercic, Karlovac (HR); Petar Jakovic, Karlovac (HR); Igor Cvjetko, Karlovac (HR)

(73) Assignee: General Electric Company, Schenectady, NY (US)

( * ) Notice: Subject to any disclaimer, the term of this patent is extended or adjusted under 35 U.S.C. 154(b) by 302 days.

(21) Appl. No.: 15/583,015

(22) Filed: May 1, 2017

(65) Prior Publication Data

US 2018/0313230 A1 Nov. 1, 2018

(51) Int. Cl.
| | |
|---|---|
| *F01D 25/30* | (2006.01) |
| *F23R 3/00* | (2006.01) |
| *F23R 3/60* | (2006.01) |
| *F01D 25/14* | (2006.01) |

(52) U.S. Cl.
CPC .......... *F01D 25/30* (2013.01); *F01D 25/145* (2013.01); *F23R 3/00* (2013.01); *F23R 3/002* (2013.01); *F23R 3/60* (2013.01)

(58) Field of Classification Search
CPC .......... F01D 25/30; F01D 25/145; F23R 3/00; F23R 3/002; F23R 3/60
See application file for complete search history.

(56) References Cited

U.S. PATENT DOCUMENTS

| | | | | |
|---|---|---|---|---|
| 2,544,538 | A * | 3/1951 | Mahnken | F02K 1/822 |
| | | | | 126/39 M |
| 4,158,949 | A * | 6/1979 | Reider | F23R 3/50 |
| | | | | 60/737 |
| 5,799,491 | A * | 9/1998 | Bell | F23R 3/002 |
| | | | | 60/752 |
| 6,041,590 | A * | 3/2000 | Hayton | F02K 1/822 |
| | | | | 60/766 |
| 7,942,004 | B2 * | 5/2011 | Hodder | F23M 5/02 |
| | | | | 52/509 |
| 2003/0213250 | A1 * | 11/2003 | Pacheco-Tougas | F23R 3/002 |
| | | | | 60/752 |
| 2006/0207259 | A1 * | 9/2006 | Holt | F23M 5/085 |
| | | | | 60/772 |
| 2015/0260399 | A1 * | 9/2015 | Low | F23R 3/002 |
| | | | | 60/772 |
| 2016/0265784 | A1 | 9/2016 | Bangerter et al. | |

* cited by examiner

*Primary Examiner* — Steven M Sutherland
(74) *Attorney, Agent, or Firm* — Dority & Manning, P.A.

(57) ABSTRACT

A turbomachine, e.g., a gas turbine, includes a compressor, a combustion section downstream from the compressor, a turbine downstream from the combustion section and an exhaust section downstream from the turbine. The exhaust section includes a diffuser. The diffuser includes an outer casing and a liner radially inward of the outer casing. The liner includes a plurality of discrete liner panels. The diffuser further includes a plurality of radial support members extending radially inward from the outer casing. The diffuser also includes a plurality of axial support members disposed proximate to the liner.

17 Claims, 8 Drawing Sheets

SEGMENTED LINER

FIELD

The present disclosure generally involves a turbomachine, such as a gas turbine. More particularly, the disclosure relates to a segmented liner system for a component of a turbomachine, such as a diffuser of an exhaust gas system.

BACKGROUND

A gas turbine generally includes, in serial flow order, an inlet system, a compressor, a combustion section and a turbine. Various exhaust gas related components may be disposed downstream from an outlet of the turbine including but not limited to an exhaust gas diffuser, an exhaust plenum, a bypass stack, a diverter damper, or a heat recovery steam generator (HRSG), among others. The exhaust gas diffuser defines a flow path for routing relatively hot combustion gases away from the turbine. The hot combustion gases may then be routed through the various outer exhaust gas related components.

The exhaust gas diffuser is typically formed by an outer casing or shell and multiple liner panels that are coupled to an inner surface of the outer casing and that define an outer flow boundary of the flow path. In order to reduce the temperature of the outer casing, insulation, usually in the form of fiber batts, is packed between the inner surface of the outer casing and an outer surface of each liner panel.

The liner panels are typically coupled to supports that are welded to the inner surface of the casing. These connections are subject to stress from various sources, such as movement of the liner panels relative to the outer casing. Such relative movement may be caused by vibration of the panel and/or differing thermal growth rates of the liner panels and the outer casing, among others. Over time, this may potentially lead to liner panel buckling, other deformation, cracking, and/or disengagement of the panel(s) from the coupling.

When a liner panel as described above is in need of maintenance or replacement, the entire liner panel must be removed, which requires significant labor and expense.

BRIEF DESCRIPTION

Aspects and advantages of the invention are set forth below in the following description, or may be obvious from the description, or may be learned through practice of the invention.

According to one example embodiment, a component of a turbomachine is provided. The component includes an outer casing and a liner radially inward of the outer casing. The liner includes a plurality of discrete liner panels. The component further includes a plurality of radial support members extending radially inward from the outer casing. The component also includes a plurality of axial support members disposed proximate to the liner.

In accordance with another example embodiment, a gas turbine is provided. The gas turbine includes a compressor, a combustion section downstream from the compressor, a turbine downstream from the combustion section, an exhaust section downstream from the turbine, and a component. The component includes an outer casing and a liner radially inward of the outer casing. The liner includes a plurality of discrete liner panels. The component further includes a plurality of radial support members extending radially inward from the outer casing. The component also includes a plurality of axial support members disposed proximate to the liner.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
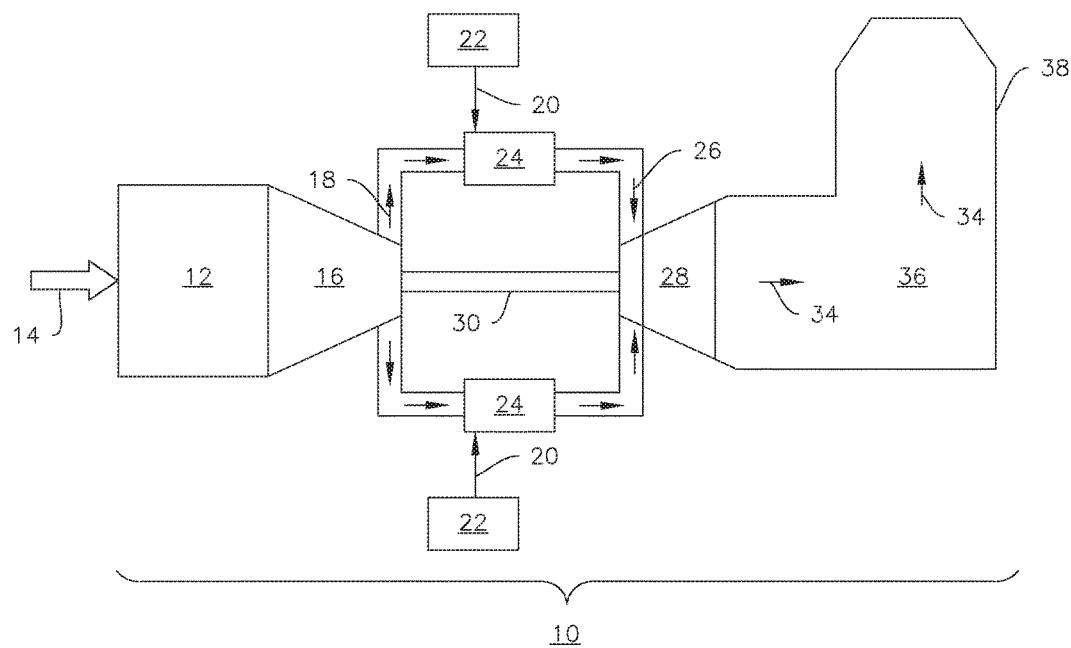
FIG. 1 is a functional block diagram of an exemplary gas turbine that may incorporate various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a liner system for an exhaust diffuser for a land based power generating gas turbine for purposes of illustration, one of ordinary skill in the art will readily appreciate that embodiments of the present invention may be applied to any type of turbomachine component which includes a casing and a liner, such as any exhaust gas enclosure or exhaust gas related component including but not limited to an exhaust gas plenum, a bypass stack, a diverter damper, a heat recovery steam generator (HRSG) and/or a waste heat recovery unit (WHRU). In addition, the component may be associated with any turbomachine type such as a steam turbine, a marine gas turbine or aircraft gas turbine and is not limited to land based power generating gas turbines unless specifically recited in the claims.

Referring now to the drawings, wherein identical numerals indicate the same elements throughout the figures, FIG. 1 provides a functional block diagram of an exemplary gas turbine 10 that may incorporate various embodiments of the present disclosure. As shown, the gas turbine 10 generally includes an inlet section 12 that may include a series of filters, cooling coils, moisture separators, and/or other devices to purify and otherwise condition a flow of air 14 or other working fluid entering the gas turbine 10. The air 14 flows from the inlet section 12 to a compressor section where a compressor 16 progressively imparts kinetic energy to the air 14 to produce compressed air 18.

The compressed air 18 is mixed with a fuel 20 from a fuel supply system 22 to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed air 18. Alternately or in addition, the shaft 30 may connect the turbine 28 to a generator (not shown) for producing electricity. Exhaust gases 34 from the turbine 28 flow through an exhaust section 36 that connects the turbine 28 to an exhaust stack 38 downstream from the turbine 28. The exhaust section 36 may include various components, for example, an exhaust diffuser and a heat recovery steam generator (not shown) for cleaning and extracting additional heat from the exhaust gases 34 prior to release to the environment.

Figure 2:
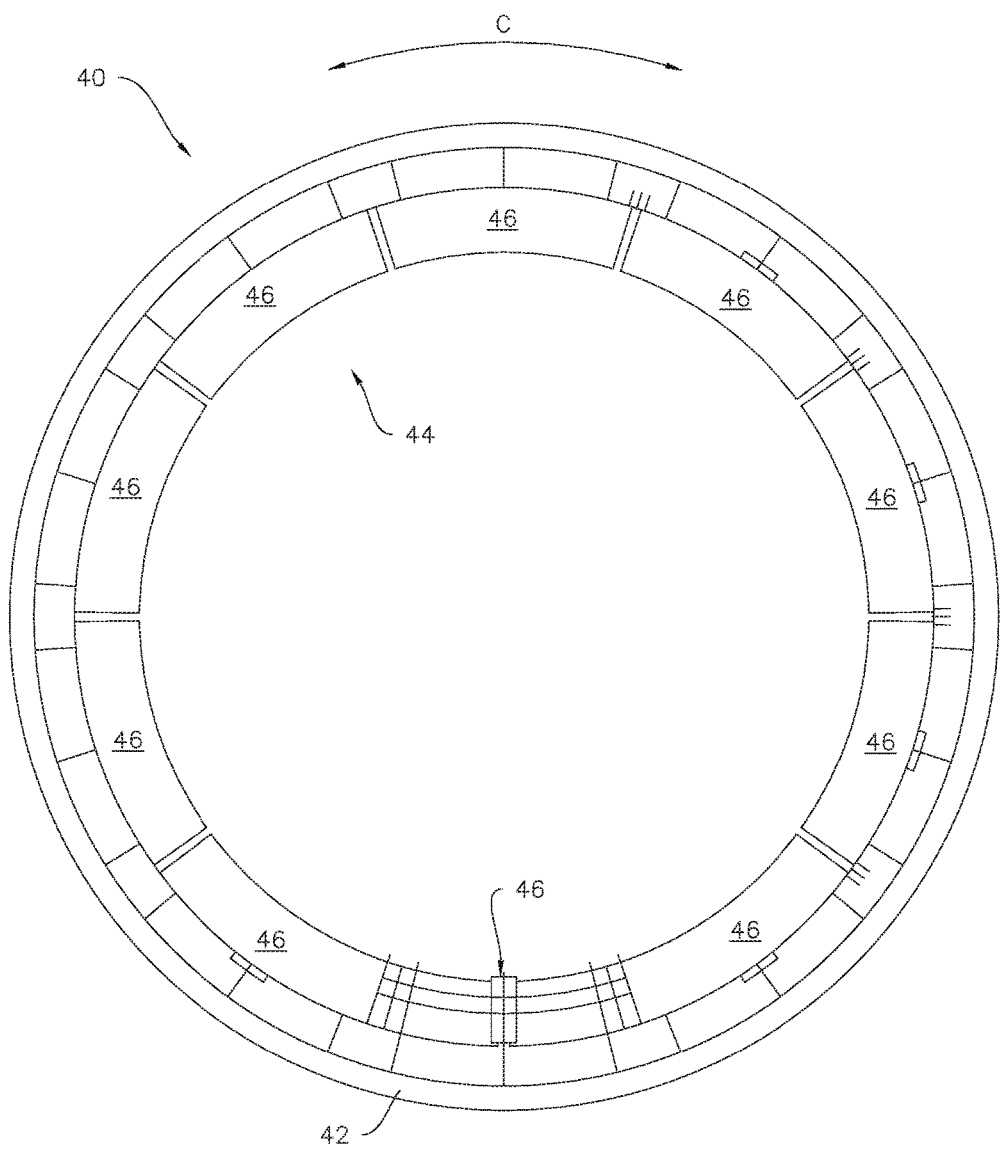
FIG. 2 provides an end view of an exemplary exhaust diffuser that may incorporate various embodiments of the present disclosure.

FIG. 2 provides an end view of an exemplary component which may incorporate one or more embodiments of the present disclosure, in this example the component is an exhaust diffuser 40 for a gas turbine 10. As shown in FIG. 2, exhaust diffuser 40 may include an outer casing 42 and a liner 44 spaced radially inward of the outer casing 42. The outer casing 42 may typically be formed from carbon steel. Insulation (not shown), which may be provided in the form of fiber batts, is installed between the outer casing 42 and the liner 44. The insulation protects the carbon steel outer casing 42 from exhaust gas temperatures which may exceed 1400 degrees F.

As shown in FIG. 2, the liner 44 may include a plurality of liner panels 46, typically formed from stainless steel, and disposed radially inwardly of the outer casing 40. The liner panels 46 may be arcuate in form. The number of liner panels 46 may vary depending on exhaust duct size. The liner panels 46 define an outer flow boundary for the exhaust gases 34 (FIG. 1) flowing from the turbine 28 towards the exhaust stack 38 and provide cover for the insulation. Also as shown in FIG. 2, at least one of the liner panels 46 may comprise a plurality of segments, as will be described in more detail below. It is to be understood that the illustration of FIG. 2 is by way of example only, e.g., more than one, up to and including all, of the panels 46 may comprise a plurality of segments.

Figure 3:
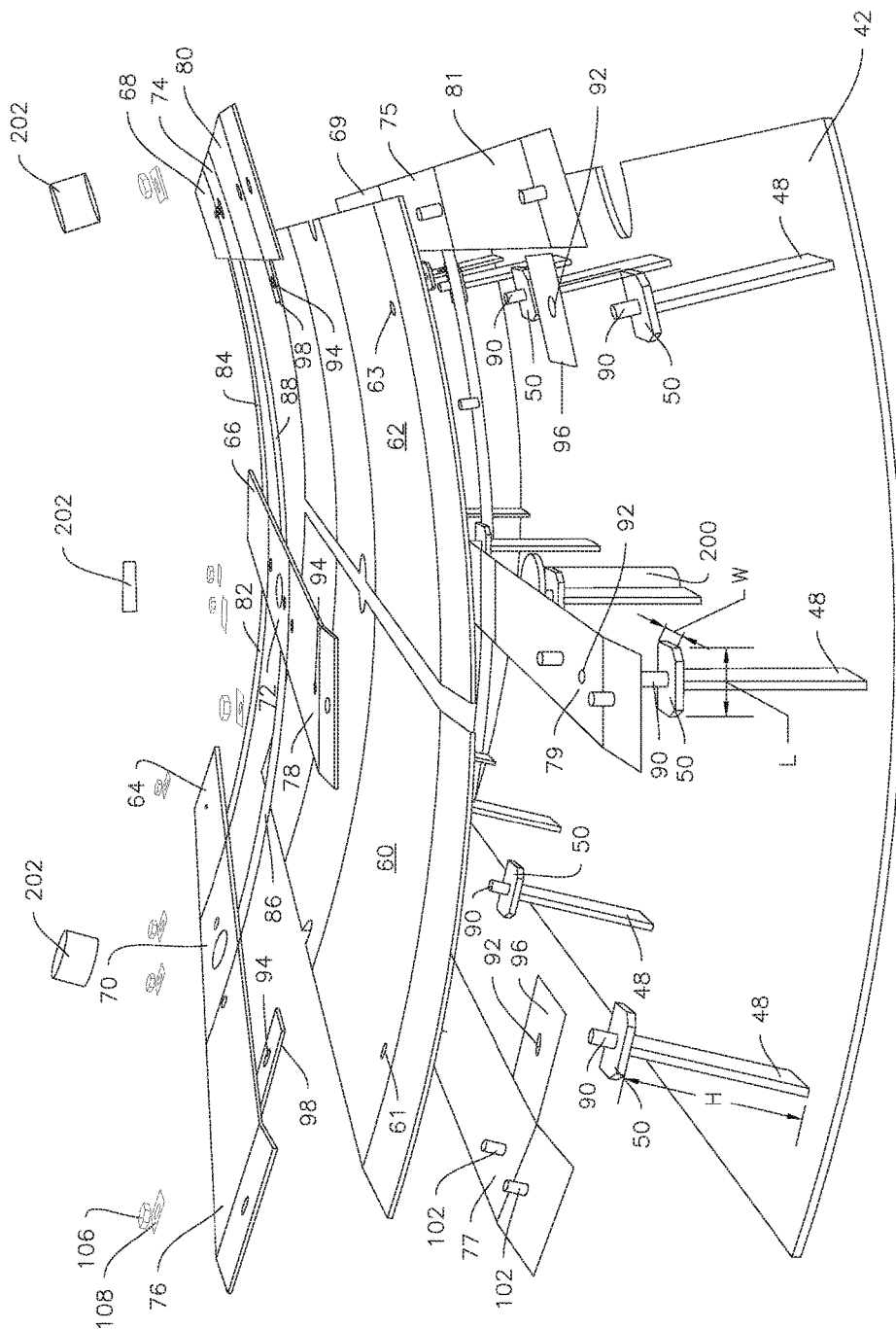
FIG. 3 is an exploded partial perspective view of a portion of the diffuser of FIG. 2.
Figure 4:
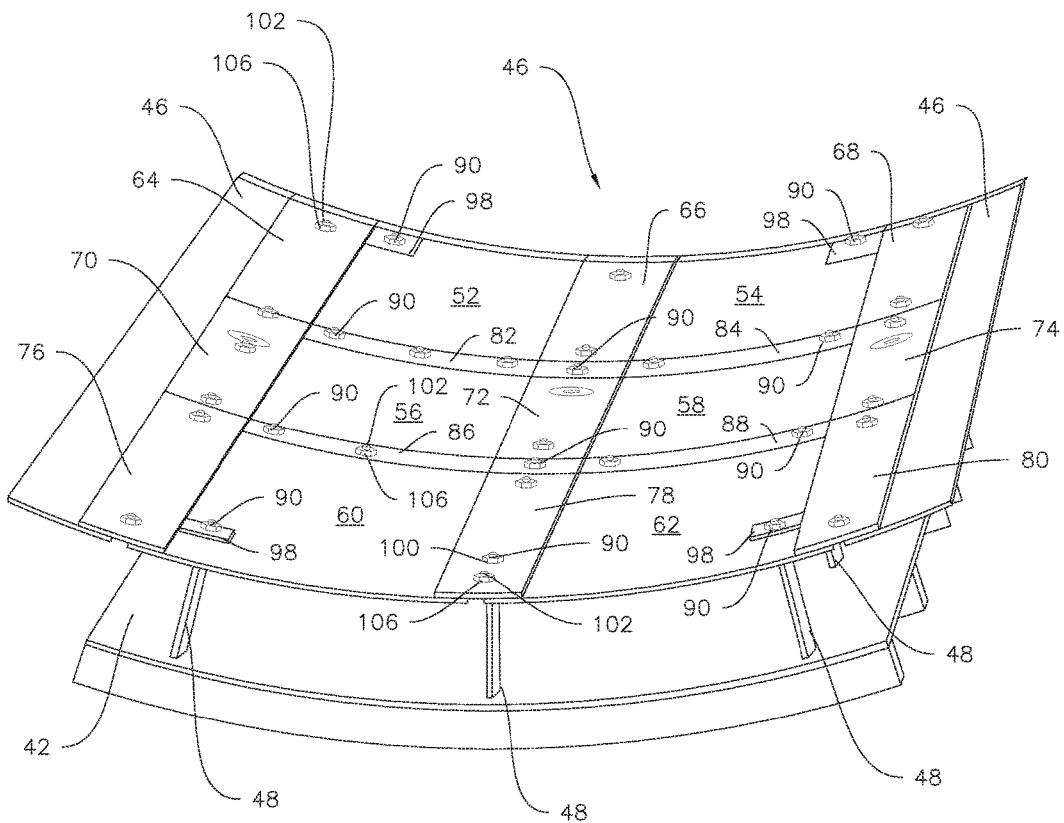
FIG. 4 is a partial perspective view of the diffuser of FIG. 2.

Referring now to FIGS. 3 and 4, an example liner panel 46 is illustrated which comprises of a plurality of discrete segments. More particularly, in the illustrated embodiment, the liner panel 46 comprises six segments, including a forward pair of circumferentially adjacent segments 52 and 54, an intermediate pair of circumferentially adjacent segments 56 and 58, and an aft pair of circumferentially adjacent segments 60 and 62.

Figure 5:
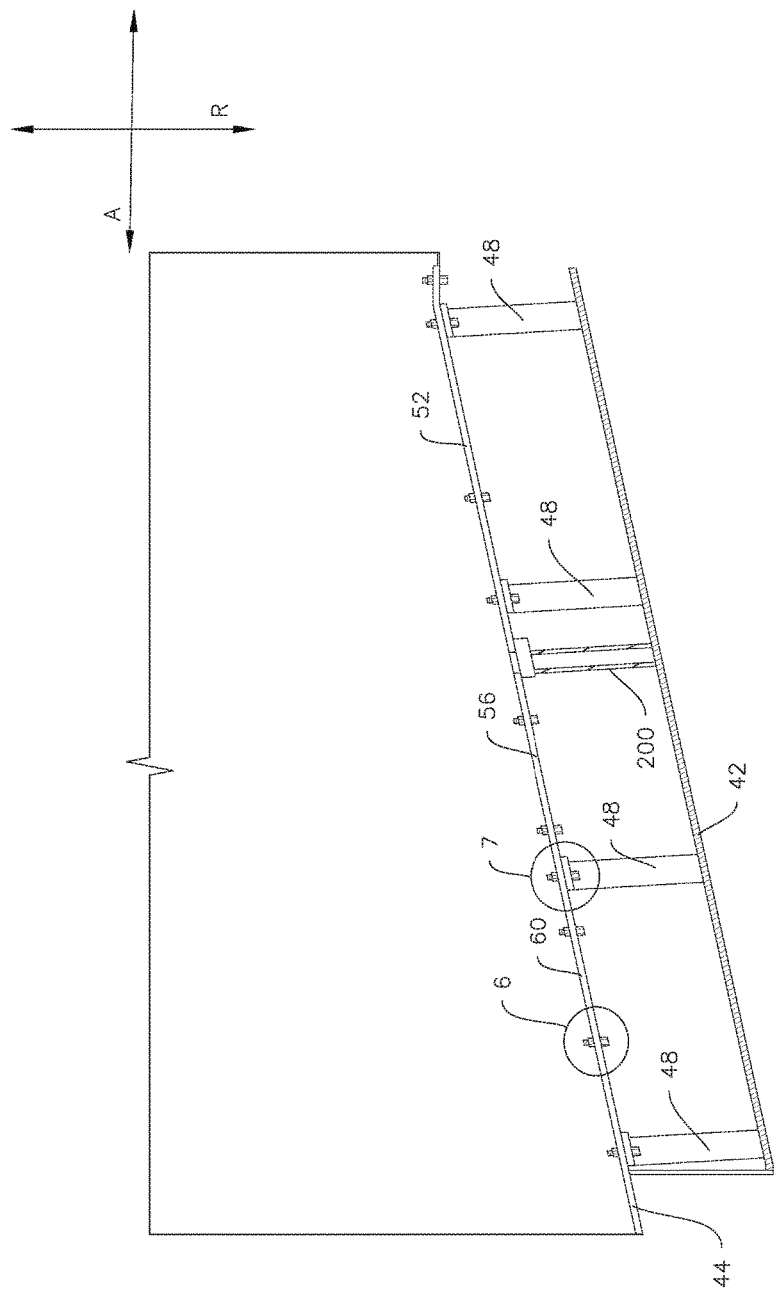
FIG. 5 is a side section view of the diffuser of FIG. 2.

Still with reference to FIGS. 3 and 4, a plurality of support members may be provided. In some embodiments, the plurality of support members may include both axial and circumferential support members, each comprising an elongate main body, the elongate main body of each axial support member extending generally along the axial direction A (FIG. 5) and the elongate main body of each circumferential support member extending generally along the circumferential direction C (FIG. 2). For example, as best seen in FIG. 4, the illustrated embodiment provides nine inner axial support members positioned inward of the liner 46 along the radial direction R (FIG. 5), with one of the plurality of axial support members positioned proximate to each axial edge of each segment of the panel. The inner axial support members of the illustrated example embodiment include forward inner axial support members 64, 66, and 68, intermediate inner axial support members 70, 72, and 74, and aft inner axial support members 76, 78, and 80.

The example forward inner axial support members include a first forward edge axial support member 64 positioned at a forward edge of the panel 46, e.g., adjacent to an external edge of forward segment 52, a forward center axial support member 66 positioned between segment 52 and segment 54, and a second forward edge axial support member 68 positioned at an opposing forward edge of the panel 46, e.g., adjacent to an external edge of forward segment 54. The example intermediate inner axial support members include a first intermediate edge axial support member 70 positioned at an intermediate edge of the panel 46, e.g., adjacent to an external edge of intermediate segment 56, an intermediate center axial support member 72 positioned between segment 56 and segment 58, and a second intermediate edge axial support member 74 positioned at an opposing intermediate edge of the panel 46, e.g., adjacent to an external edge of intermediate segment 58. The example aft inner axial support members include a first aft edge axial support member 76 positioned at an aft edge of the panel 46, e.g., adjacent to an external edge of aft segment 60, an aft center axial support member 78 positioned between segment 60 and segment 62, and a second aft edge axial support member 80 positioned at an opposing aft edge of the panel 46, e.g., adjacent to an external edge of aft segment 62.

As shown in the illustrated example embodiments, a plurality of outer axial support members may be provided, each outer axial support member of the plurality of outer axial support members corresponding to a respective one of the inner axial support members. As best seen in FIG. 3, the outer axial support members may be disposed between the liner 44 and radial support members 48 along the radial direction R. For example, each inner axial support member may be positioned proximate a radially inner side of one of the segments 52, 54, 56, 58, 60, and 62, and a corresponding outer axial support member may be provided on the opposite side, e.g., a radially outer side, of the respective segment. For example, as illustrated in FIG. 3, aft outer axial support members 77, 79, and 81, may be provided each corresponding to a respective one of the aft inner axial support members 76, 78, and 80. As further illustrated in FIG. 8, the plurality of outer axial support members may also include intermediate outer axial support members 71, 73, and 75, and forward outer axial support members 65, 67, and 69.

As illustrated for example in FIG. 3, the diffuser 40 may include a plurality of radial support members 48 extending radially inward from the outer casing 42. A bracket 50 may be mounted on each radial support member 48 at one end of the respective radial support member 48, e.g., distally from the outer casing 42. Further, each bracket 50 may extend orthogonally to the respective radial support member 48. For example, as shown in FIG. 3, each radial support member 48 may have a radial extent, e.g., a height H defined along the radial direction, and each corresponding bracket 50 may have a circumferential extent which is generally orthogonal to the radial extent of the radial support member 48, e.g., a length L defined generally along the circumferential direction and orthogonal to the height H of the radial support member, and an axial extent, e.g., a width W defined along the axial direction, which is orthogonal to the height H of the radial support member.

Further, as may be seen in FIG. 3, each bracket 50 includes a threaded fastener 90. In the illustrated embodiment, the threaded fasteners 90 are externally threaded fasteners which extend radially inward from each respective bracket 50. However, in other embodiments, it is also possible for the threaded fasteners 90 to be provided as internally threaded fasteners.

In the example embodiment illustrated by FIG. 3, the externally threaded fasteners 90 extend radially inward from each bracket 50, and in an assembled condition, each of the externally threaded fasteners 90 extends through a hole 92 in a corresponding outer axial support member and a hole 94 in a corresponding inner axial support member. In some embodiments, the holes 92 and 94 may be positioned on the elongate main body of the respective inner and outer axial support members, e.g., as illustrated by aft center outer axial support member 79 and aft center inner axial support member 78 in FIG. 3. In other embodiments, the holes 92 and 94 may also or instead be positioned on tabs 96 and 98, each of which projects away from the elongate main body of a respective axial support member along the circumferential direction C, for example as illustrated by first aft edge outer axial support member 77 and first aft edge inner axial support member 76 in FIG. 3. In some embodiments, the edge axial support members may each comprise a plurality of tabs projecting away from the axial support member in both directions, e.g., both clockwise and counter-clockwise along the circumferential direction. For example, where two adjacent panels 46 each comprise a plurality of discrete segments, the edge axial support members which are positioned along the adjacent edges of the two panels 46 may include circumferential tabs projecting therefrom in both directions.

Figure 9:
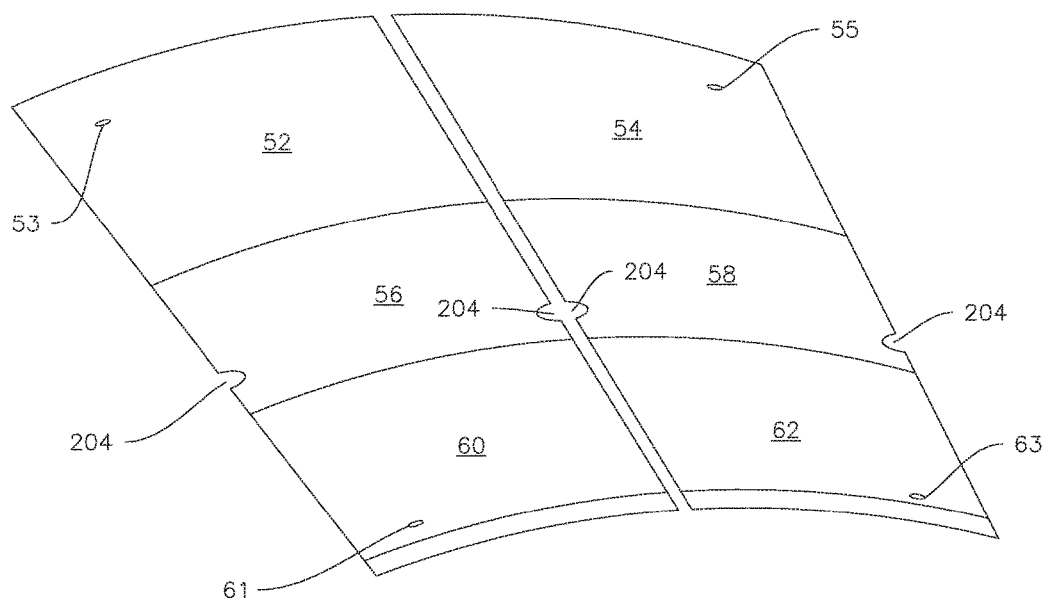
FIG. 9 is a perspective view of a plurality of discrete segments of a liner panel according to various embodiments of the present disclosure.

As may be seen in FIGS. 3 and 4, the panel 46 comprises four corners and one of the fasteners 90 extends through each of the four corners. More particularly, as best seen in FIG. 9, segment 52 comprises a hole 53 near a forward external corner thereof, segment 54 comprises a hole 55 near a forward external corner thereof, segment 60 comprises a hole 61 near an aft external corner thereof, and segment 62 comprises a hole 63 near an aft external corner thereof. Each of the corner holes 53, 55, 61, and 63 receives a respective one of the threaded fasteners 90.

Figure 7:
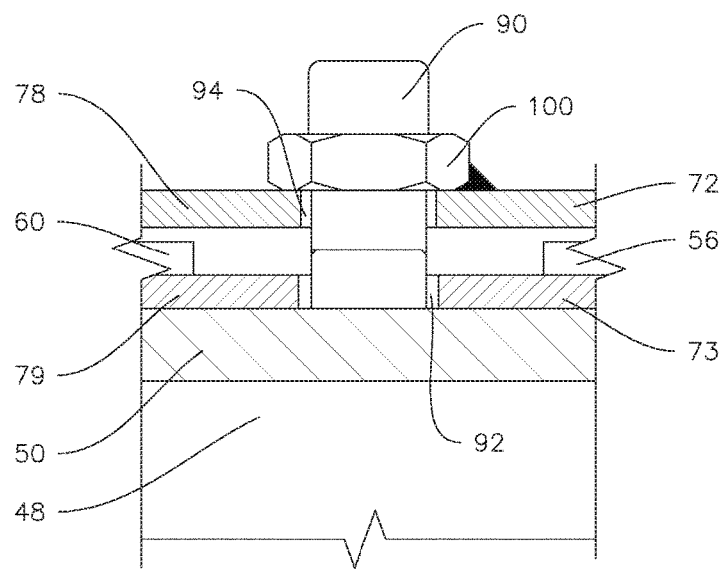
FIG. 7 is an enlarged view of another portion of FIG. 4.

In various embodiments, mating threaded fasteners may be provided for threadedly engaging the threaded fasteners of the brackets 50. As may be seen in FIGS. 4, and 7, in the illustrated example embodiment, internally threaded fasteners 100 may be provided to threadedly engage each externally threaded fastener 90. The internally threaded fasteners 100 may be provided radially inward of the inner axial support members.

Figure 6:
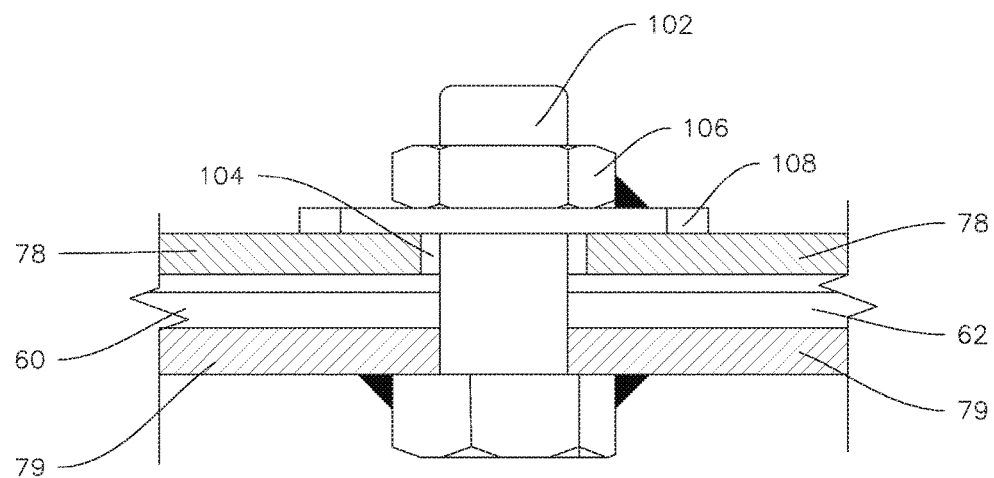
FIG. 6 is an enlarged view of a portion of FIG. 4.

In various embodiments, a plurality of externally threaded fasteners 102 extending between the inner axial support members and the outer axial support members along the radial direction may be provided. Each externally threaded fastener 102 of the plurality of externally threaded fasteners may so extend proximate to an edge of one of the discrete segments, but without passing through the segments. Additionally, the externally threaded fasteners 102 may be part of or joined with one of the inner axial support members and the outer axial support members, while the other of the inner axial support members and the outer axial support members may include a plurality of holes 104, each hole 104 of the plurality of holes 104 receiving a corresponding one of the plurality of externally threaded fasteners 102. For example, as illustrated in FIGS. 3 through 8, each of the outer axial support members may include a plurality of externally threaded fasteners 102 extending radially inward therefrom, and each of the inner axial support members may include a hole 104 for receiving a respective one of the externally threaded fasteners 102. More particularly, as illustrated in FIG. 6, outer axial support member 79 includes an externally threaded fastener 102 extending radially inward therefrom, and inner axial support member 78 includes a hole 104 therein. The externally threaded fastener 102 extends through hole 104.

Further, a plurality of internally threaded fasteners 106 may be provided. For example, each internally threaded fastener 106 of the plurality of internally threaded fasteners 106 may be configured to threadedly engage with a corresponding one of the externally threaded fasteners 102. In the illustrated example, e.g., as shown in FIG. 6, the internally threaded fastener 106 may comprise a nut 106 which can be threaded onto bolt 102.

In various embodiments, a plurality of plates 108 may be provided. The plates 108 may be positioned between the plurality of internally threaded fasteners 106 and the axial support members along the radial direction R, e.g., between inner axial support member 78 and internally threaded fastener 106, as illustrated in FIG. 6. Also as may be seen in FIG. 6, each plate 108 may include a hole 110, and a respective externally threaded fastener 102 of the plurality of externally threaded fasteners 102 may extend through the hole 110 of each plate 108.

As illustrated for example in FIG. 6, the externally threaded fasteners of the outer axial support members may be provided as separate fasteners, e.g., bolts, which are welded to a radially outer side of the outer axial support members and extend radially inwardly through the outer axial support members. However, in other embodiments, the externally threaded fasteners may be integrally formed with the inner or outer axial support members, for example by additive manufacturing or other suitable manufacturing methods.

In the example embodiments illustrated in FIGS. 3 through 8, the externally-threaded fasteners are associated with the outer axial support members and the internally threaded fasteners are associated with the inner axial support members. However, it is understood that such relationship can be inverse, e.g., the externally threaded fasteners may extend radially outward from the inner axial support members and the internally threaded fasteners may be positioned outward of the outer axial support members. For example, in such embodiments, a nut may be welded to each of a plurality of holes in each outer axial support member and a corresponding bolt may extend from the respective inner axial support member to each nut. Further, similar arrangements may be provided with respect to the radial support members and the circumferential support members.

Figure 8:
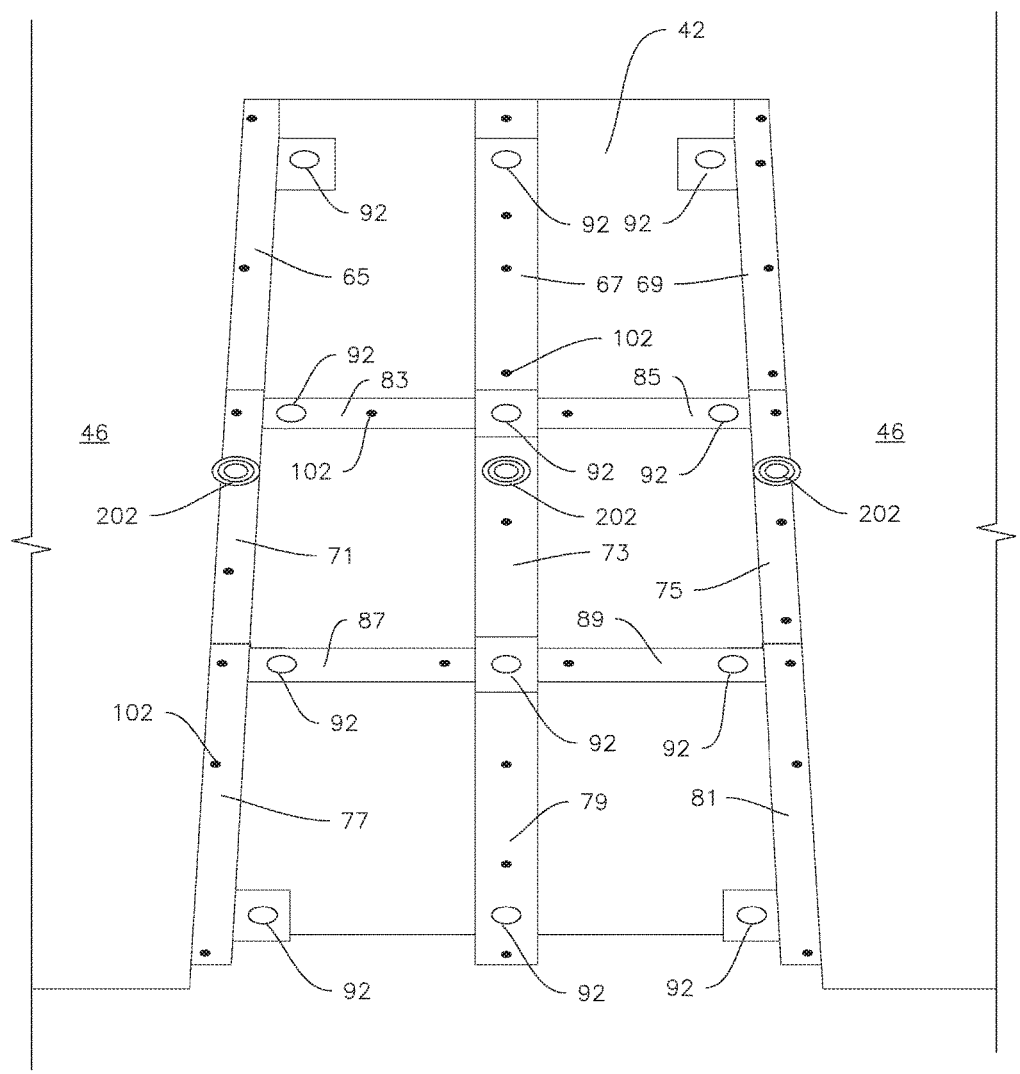
FIG. 8 is a plan view of a plurality of outer support members for a liner panel according to various embodiments of the present disclosure.

As may be seen in FIGS. 3, 4, and 8, a plurality of circumferential support members extending between adjacent axial support members may be provided. More particularly, the circumferential support member may extend along internal edges of the discrete segments, such edges being internal with respect to the overall structure of the panel 46. For example, as illustrated in FIG. 4, inner circumferential support members may include a first inner circumferential support member 82 between forward segment 52 and intermediate segment 56, a second inner circumferential support member 84 between forward segment 54 and intermediate segment 58, a third inner circumferential support member 86 between intermediate segment 56 and aft segment 60, and a fourth inner circumferential support member 88 between intermediate segment 58 and aft segment 62.

In a similar fashion as the inner and outer axial support members, the circumferential support members may include a plurality of inner circumferential support members 82, 84, 86, and 88 (best seen in FIG. 4) and a plurality of outer circumferential support members 83, 85, 87, and 89 (best seen in FIG. 8), which correspond to the plurality of inner circumferential support members. Additional internally threaded fasteners 106 and externally threaded fasteners 102 may be provided in association with the circumferential support members, in a similar fashion as described above with respect to the axial support members. Further, additional plates 108 may also be provided in association with the circumferential support members, in a similar fashion as described above with respect to the axial support members.

The construction of liner panels 46 as shown and described herein, e.g., using a plurality of segments and various support members provides easier handling and installation, longer usable life, and enhanced maintainability. For example, a liner panel 46 comprising a plurality of segments as shown and described herein may be installed in the exhaust section of a gas turbine while the gas turbine is in a closed engine configurations. As another example, the relatively smaller size of segments 52, 54, 56, 58, and 60 results in a higher resonant frequency of the panel 46, such that vibration damage may be avoided or minimized. As yet another example, if maintenance is required, each segment (or a group of segments, if needed) in a panel can be removed and replaced independently of every other segment in the panel.

As may be seen in FIG. 3, the outer casing 42 may include a conduit 200 for accessing the exhaust gas flow through the diffuser 40. For example, a probe or sensor may be inserted into conduit 200 to measure a temperature of the exhaust gas flow. In order to accommodate the conduit 200 and facilitate access to the exhaust gas flow, one or more segments may include cutouts 204 and a bushing 202 therebetween. For example, as shown in FIG. 9, the intermediate segments 56 and 58 may include cutouts 204.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A component of a turbomachine, the component comprising:
    an outer casing;
    a liner radially inward of the outer casing, the liner comprising a plurality of discrete liner panels;
    a plurality of radial support members extending radially inward from the outer casing; and
    a plurality of axial support members disposed inward of the liner along a radial direction.

2. The component of claim 1, wherein the plurality of axial support members are disposed between the liner and the plurality of radial support members along the radial direction.

3. The component of claim 1, further comprising a bracket mounted to each radial support member of the plurality of radial support members at an end of the radial support member distal from the outer casing, each bracket extending orthogonally to the respective radial support member.

4. The component of claim 3, wherein each bracket comprises a threaded fastener.

5. The component of claim 4, wherein the threaded fasteners of the brackets comprise a first plurality of threaded fasteners, the component further comprising a second plurality of threaded fasteners positioned radially inward of the plurality of axial support members, one of the first plurality of threaded fasteners and the second plurality of threaded fasteners comprising a plurality of externally threaded fasteners, the other of the first plurality of threaded fasteners and the second plurality of threaded fasteners comprising a plurality of internally threaded fasteners, each externally threaded fastener configured to threadedly engage with a respective one of the plurality of internally threaded fasteners.

6. The component of claim 5, wherein the plurality of axial support members comprises a plurality of forward axial support members, a plurality of intermediate axial support members, and a plurality of aft axial support members, each of the plurality of axial support members of the plurality of forward axial support members comprises a hole for receiving a respective one of the plurality of externally threaded fasteners, and each axial support member of the plurality of aft axial support members comprises a hole for receiving a respective one of the plurality of externally threaded fasteners.

7. The component of claim 1, further comprising a plurality of circumferential support members extending between adjacent axial support members of the plurality of axial support members.

8. A component of a turbomachine, the component comprising:
    an outer casing;
    a liner radially inward of the outer casing, the liner comprising a plurality of discrete liner panels;
    a plurality of radial support members extending radially inward from the outer casing; and
    a plurality of axial support members disposed proximate to the liner, wherein the plurality of axial support members comprises a plurality of outer axial support members disposed outward of the liner between the liner and the plurality of radial support members along a radial direction and a plurality of inner axial support members disposed inward of the liner along the radial direction.

9. The component of claim 1, wherein at least one panel of the plurality of discrete liner panels comprises a plurality of discrete segments.

10. The component of claim 9, further comprising a plurality of externally threaded fasteners extending between the plurality of inner axial support members and the outer axial support members along the radial direction, each externally threaded fastener of the plurality of externally threaded fasteners extending proximate to an edge of one of the plurality of discrete segments.

11. The component of claim 10, wherein each axial support member of one of the plurality of inner axial support members and the plurality of outer axial support members comprises a plurality of holes, each hole of the plurality of holes receiving a corresponding one of the plurality of externally threaded fasteners.

12. The component of claim 11, further comprising a plurality of plates positioned between the plurality of internally threaded fasteners and the plurality of discrete segments along the radial direction, each plate comprising a hole, and a respective externally threaded fastener of the plurality of externally threaded fasteners extending through the hole of each plate.

13. The component of claim 10, further comprising a plurality of internally threaded fasteners, each internally threaded fastener of the plurality of internally threaded fasteners configured to threadedly engage with a corresponding one of the externally threaded fasteners.

14. A gas turbine, comprising:
a compressor, a combustion section downstream from the compressor, a turbine downstream from the combustion section, an exhaust section downstream from the turbine, and a component, the component comprising:
an outer casing;
a liner radially inward of the outer casing, the liner comprising a plurality of discrete liner panels;
a plurality of radial support members extending radially inward from the outer casing;
a plurality of axial support members disposed proximate to the liner; and
a bracket mounted to each radial support member of the plurality of radial support members at an end of the radial support member distal from the outer casing, each bracket extending orthogonally to the respective radial support member.

15. The gas turbine of claim 14, wherein the liner comprises a plurality of panels, one or more of the plurality of panels comprising a plurality of segments.

16. The gas turbine of claim 14, wherein the plurality of axial support members comprises a plurality of outer axial support members disposed outward of the liner between the liner and the plurality of radial support members along the radial direction and a plurality of inner axial support members disposed inward of the liner along the radial direction.

17. The gas turbine of claim 14, further comprising a plurality of circumferential support members extending between adjacent axial support members of the plurality of axial support members.

* * * * *